FUEL PUMP AND PURGING SYSTEM THEREFOR

Original Filed Dec. 9, 1965 3 Sheets-Sheet 1

INVENTOR.
VERNON D. ROOSA
BY Lindsey, Prutzman and Hayes
ATTORNEYS

FUEL PUMP AND PURGING SYSTEM THEREFOR

Original Filed Dec. 9, 1965 3 Sheets-Sheet 2

INVENTOR.
VERNON D. ROOSA

BY Lindsey, Prutzman and Hayes
ATTORNEYS

FUEL PUMP AND PURGING SYSTEM THEREFOR

Original Filed Dec. 9, 1965 3 Sheets-Sheet 3

INVENTOR.
VERNON D. ROOSA

BY Lindsey, Prutzman and Hayes
ATTORNEYS

United States Patent Office

Re. 27,069
Reissued Feb. 23, 1971

27,069

FUEL PUMP AND PURGING SYSTEM THEREFOR

Vernon D. Roosa, West Hartford, Conn., assignor to Stanadyne, Inc., Wilson, Conn., a corporation of Delaware Original No. 3,363,569, dated Jan. 16, 1968, Ser. No. 513,153, Dec. 9, 1965. Application for reissue Jan. 13, 1970, Ser. No. 2,556

Int. Cl. F04b *25/00*

U.S. Cl. 417—253 12 Claims

Matter enclosed in heavy brackets [ ] appears in the original patent but forms no part of this reissue specification; matter printed in italics indicates the additions made by reissue.

ABSTRACT OF THE DISCLOSURE

A fuel pump having a rotor with low pressure transfer or feed pump on one end and a high pressure charge pump on the other for the delivery of discrete charges of fuel to the several cylinders of an associated engine wherein a conduit including a metering valve connects the outlet of the transfer pump to the inlet of the charge pump, and a vortex air separator in the form of a cone-shaped recess is provided in the conduit for the serial passage of fuel from the transfer pump and to the charge pump with the inlet to the separator being adjacent the larger diameter thereof and directing fuel tangentially into the separator and at an acute angle away from the apex thereof to receive fuel from the transfer pump, the separator having an outlet adjacent its apex and an air vent communicating with the central portion of its base.

The present invention relates to fuel pumps of the type utilized in fuel injection systems for delivering measured charges of fuel to the nozzles of an internal combustion engine and more particularly to the means for purging air entrapped in the fuel therefrom.

A principal aim of this invention is to provide an automatic purging arrangement for eliminating from the fuel any air which may be entrained therein.

Another object of this invention is to provide for the positive lubrication of the movable parts of the pump.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 1:
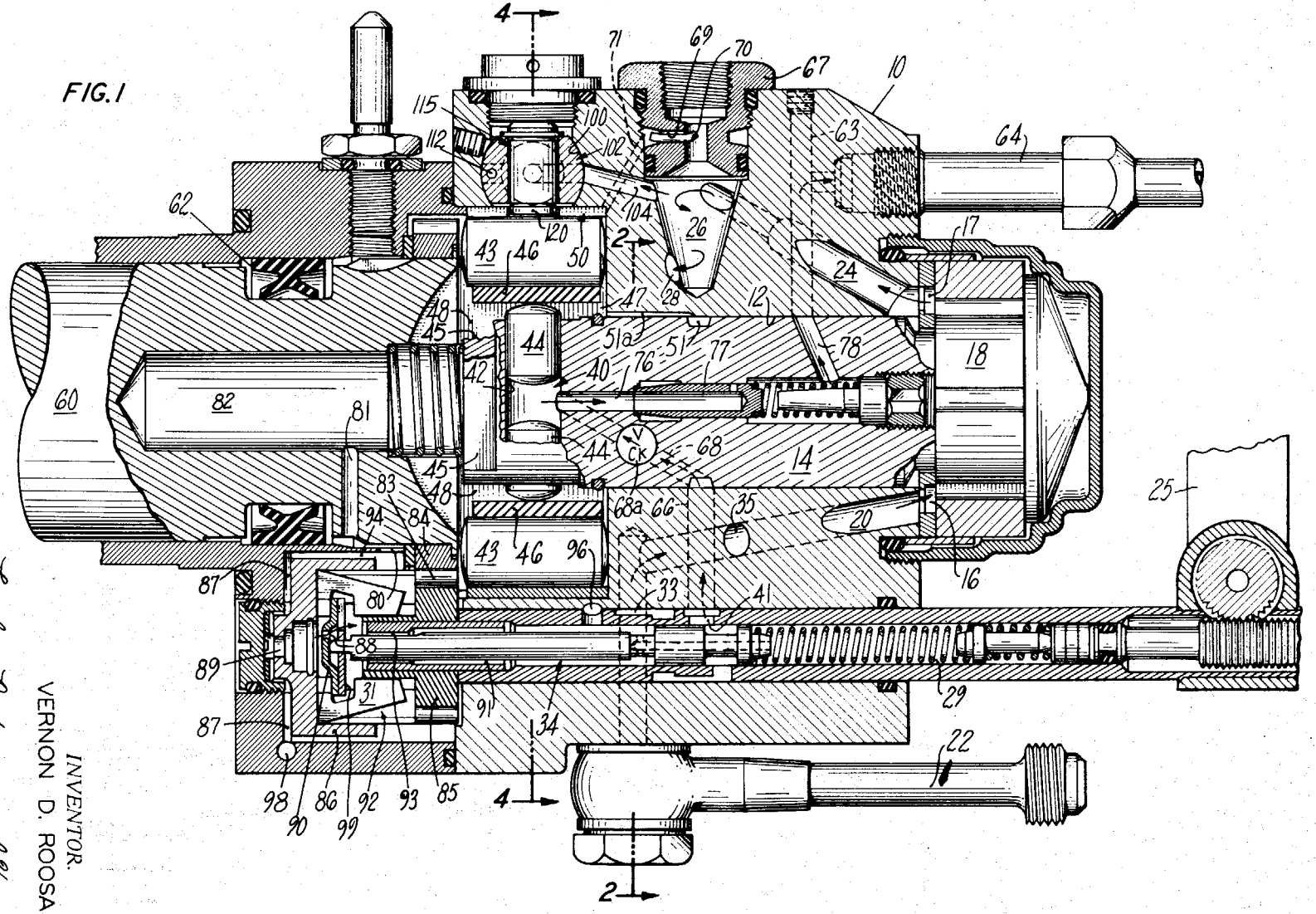
FIG. 1 is a longitudinal cross-sectional view, partly broken away, of a fuel injection pump embodying the present invention.

Referring now to the drawings in detail, in which like numerals refer to like parts throughout the several figures, a pump exemplifying the present invention is of the type now commercially available for supplying fuel charges to an associated internal combustion engine. The pump comprises an external housing or casing 10 having an axial bore or opening 12 rotatably supporting a pump rotor or distributor 14.

At the right end of the housing 10, as viewed in FIG. 1, there is mounted a vane-type fuel supply or transfer pump 18 driven by the rotor 14 and having an inlet port 16 and a discharge port 17. A diagonal inlet passage 20 delivers fuel to the transfer pump 18 from an inlet pipe 22 which is connected to a fuel supply reservoir. The transfer pump delivers fuel under pressure through an outlet passage 24 in the housing 10 to an air separator 26 from whence the fuel flows through a passage 28 (FIG. 2) in the housing 10 to a longitudinal bore 30 in the housing. A slideable spring biased pressure regulating valve 32 (FIG. 3) is mounted in the bore 30 for regulating the output pressure of the pump 18. Regulating valve 32 delivers fuel to the centrifugal metering valve 34 at a pressure correlated with the speed of the driving engine through conduit 33 and returns excess fuel to the transfer pump inlet conduit 20 through conduit 35.

Figure 4:
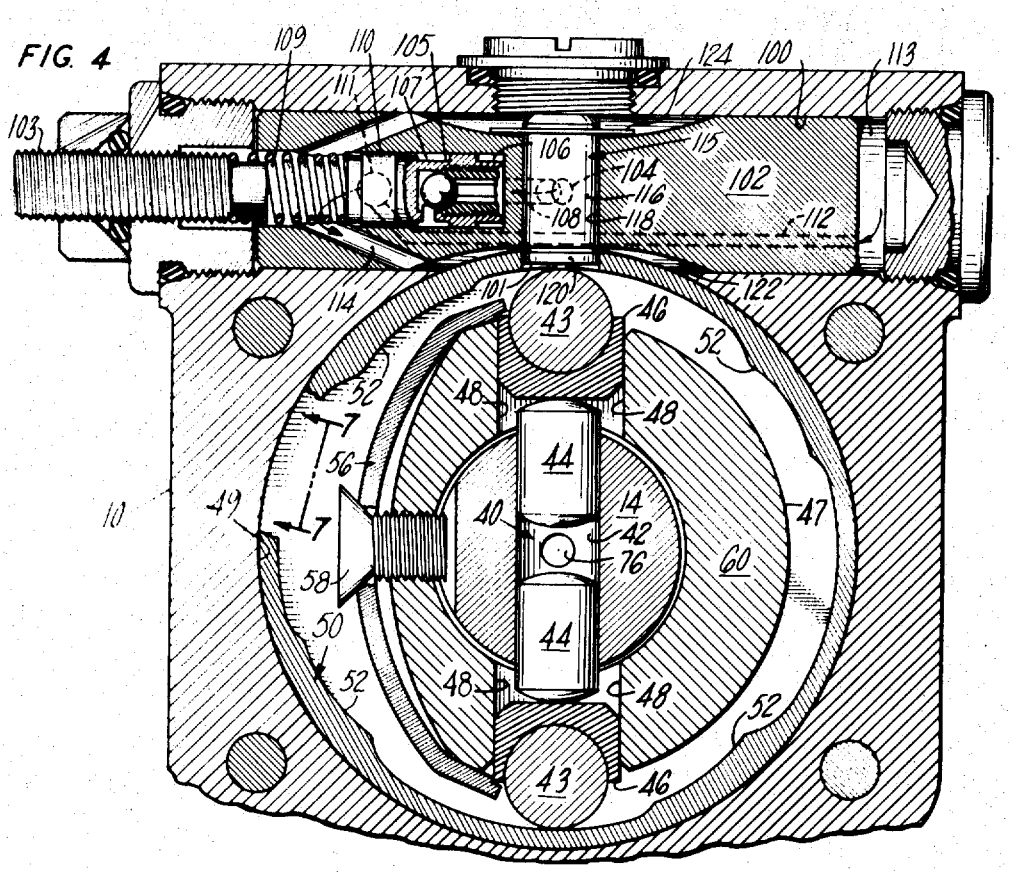
FIG. 4 is an enlarged cross-sectional view taken along the lines 4—4 of FIG. 1.

The high pressure charge pump generally denoted by the numeral 40 is formed by a transverse bore 42 in rotor 14 in which are slideably mounted a pair of opposed plungers 44. The outer ends of the plungers engage against shoes 46 which are slideably mounted in transverse passages 48 formed by the bifurcated end 47 of a separable drive shaft 60 aligned with bore 42. As shown in FIG. 4, the bifurcated end of the drive shaft 60 also provides a pair of flat opposed shoulders which engages complementary shoulders 45 on the rotor 14 to drive the same.

Surrounding the rotary member 14 is a generally circular or ring-like cam ring 50 preferably constructed of hardened steel which encircles the rotor 14 in the plane of revolution of the plungers 44 and is mounted for angular adjustment within an annular bore 49 in the pump housing. The cam has a plurality of pairs of diametrically opposed inwardly extending cam lobes 52 which are adapted to actuate the plungers 44 inwardly simultaneously for discharging fuel from the pump, it being understood that the rollers 43 and the roller shoes 46 are disposed between the plungers 44 and the cam 50 whereby the rollers 43 act as cam followers for translating the cam contour into this reciprocal movement of the plungers 44. The C-shaped ring 56 secured to the charge pump by a screw fastener 58 (FIG. 4) provides an adjustable outer resilient top for the roll shoes 46. A seal 62 is provided to prevent leakage of fuel into or out of between the shaft 60 and the housing 10.

Upon rotation of the drive shaft 60, the transfer pump 18 and the charge pump 40 are rotated to supply measured charges of fuel under pressure to a plurality of fuel pump outlets 64 having suitable connections with the fuel injection nozzles of an associated engine. During the outward or intake stroke of the plungers 44 fuel is delivered to the charge pump from the metering port 41 by a passage 66 in the housing 10 and a diagonal passage 68 in the rotor 14. During the inward or discharge stroke of the plungers 44 fuel is delivered under high pressure by an axial passage 76 to a pressure-operated delivery valve 77 and a generally radially extending distributor passage 78 adapted for sequential registration with a plurality of angularly spaced radial delivery passages 63 in fluid communication respectively with a plurality of pump outlets 64, only one of which is shown for convenience of illustration. It is to be noted that a one-way check valve 68a prevents reverse flow through inlet passage 68 during the discharge stroke of charge pump 40.

The metering valve 34 may be adjusted in any suitable manner, and in the illustrated embodiment is shown as being a spool valve axially adjustable and rotatably driven by the centrifugal governor 31 against the force of spring 29, the bias of which may be adjusted or varied by lever 25. The governor 31 is provided with a gear 85 driven by gear 84 secured to shaft 60. Inasmuch as the axial force of centrifugal governor 31 is a function of engine speed, the position of the metering valve 34 and hence the restriction offered by the metering port 41 due to the axial shifting of the spool 34 will govern the engine at a speed which may be selected by varying the bias of the compression spring 29.

Referring now specifically to FIG. 4, there is shown a transverse bore 100 in the housing 10 in which an axially movable plunger 102 is reciprocably mounted. A passage 104 (FIG. 1) from the air separator 26 is shown as being in communication with the bore 100 to deliver regulated transfer pump outlet pressure thereto. In the illustrated design, the plunger 102 includes a pilot valve 105 positioned in a chamber 106, one end of which communicates with housing passage 104 through passage 108 in plunger 102. A one-way valve is positioned in pilot valve 105 to prevent the reverse flow of fluid through the passage 108 as a result of intermittent pulsations of force imposed on the plunger 102 due to the operation of the charge pump.

Figure 2:
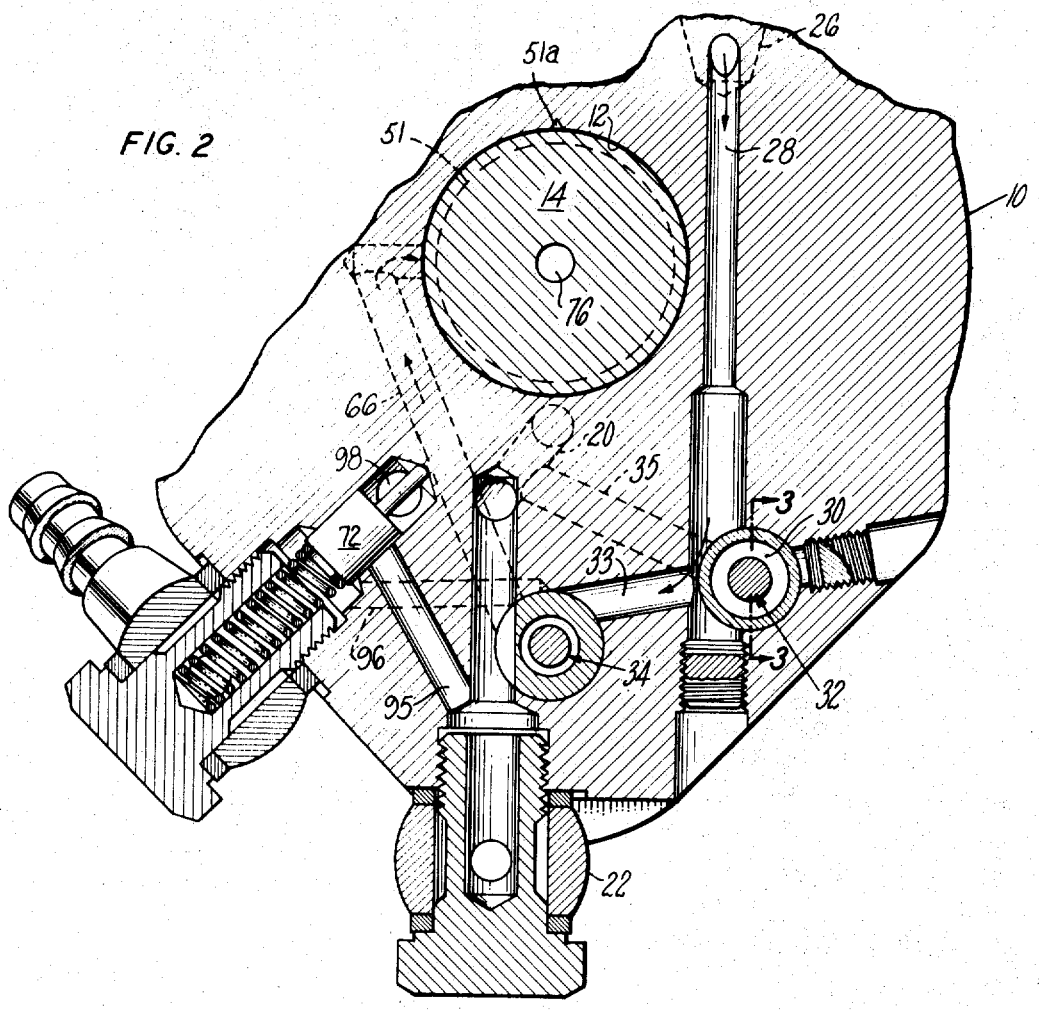
FIG. 2 is an enlarged fragmentary sectional view taken along the lines 2—2 of FIG. 1.
Figure 3:
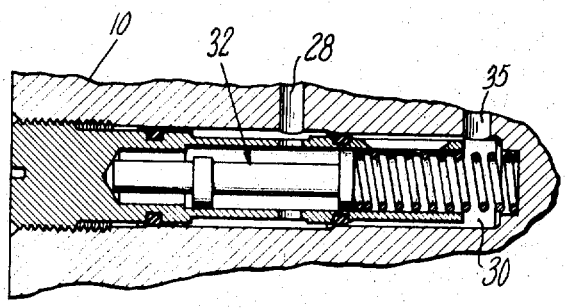
FIG. 3 is a fragmentary sectional view taken along the lines 3—3 of FIG. 2.

Pilot valve 105 is provided with an adjustable biasing spring 109 which engages the end of a threaded adjusting screw 103 at the end of transverse housing bore 100. Spring 109 opposes the transfer pump outlet pressure acting on the right end of the pilot valve with the result that transfer pump output pressure will urge the plunger 102 to the left, as seen in FIG. 2, against the bias of compression spring 109.

Pilot valve 105 is also provided with an annular land 110 which is axially shiftable over port 111 in the plunger 102. Port 111 communicates through passage 112 to a chamber 113 formed in the end of transverse housing bore 100 to deliver fuel under pressure thereto when annular land 110 of the pilot valve is moved to the left to provide communication between passage 106 and port 111 via annulus 107 and passage 112. Inasmuch as the transfer pump pressure is a function of engine speed, the balanced position assumed by the pilot valve is determined by the equilibrium between the forces imposed thereon by the transfer pump pressure and spring. This, in turn, determines whether the port 111 communicates with annulus 112 to receive additional fuel from the transfer pump (and hence shift plunger 102 to the left to advance the time of injection) or the port 111 communicates with passage 114 to dump a portion of the fuel trapped in the chamber 113 into the pump housing through passage 114 to permit the plunger 102 to move to the right. As shown in FIG. 4, the left end of annulus 107 is of reduced cross section to throttle the flow of fuel therethrough and stabilize the operation of the pilot valve.

Since one end of the spring 109 engages stationary screw 103, it will be apparent that when the pilot valve is in equilibrium, the port 111 will be automatically closed by land 110 as the plunger 102 moves to the left by the increased fuel entering chamber 113.

For operatively connecting plunger 102 and cam 50, there is provided an arm 115 having a cylindrical body 116 mounted in a complementary radial bore 118 in the plunger 102. The connector 115 has an integral head 120 loosely received within a bore 101 of the cam ring 50 which serves as a socket therefor. The plunger 102 is recessed at 122 to receive a portion of the cam ring 50 extending within the bore 100, and the connector 115 is preferably dimensioned to reciprocate with the plunger 102 within the peripheral confines of the bore 100. A snap ring 124 seated in an annular groove in the connector 115 prevents excess axial movement of the connector toward the cam ring.

A certain quantity of air is nearly always entrained in diesel fuel. If not removed, such air results in the erratic operation of the fuel pump and may prevent the pump from building up adequate pressure for satisfactory performance, particularly during starting. In accordance with this invention, means are provided for removing any air which may be entrained in the fuel.

As shown in FIG. 1, the means provided includes an air separator 26 which takes the form of an inverted cone, shown as having conical side walls with an included angle of about 30°, disposed downstream of the transfer pump 18 and upstream of the metering port 41 and charge pump 40 to remove the air from the fuel prior to its passage into the metering valve and the charge pump. The passage 24, which delivers output fuel from transfer pump 18 to the air separator 26, has a restricted cross section for a portion of its length at the end thereof which communicates with the air separator 26. With this construction, the velocity of the fuel entering into the air separator 26 is increased to speed up the fuel as it whirls around the conical walls of the air separator toward exit passage 28 thereby to improve the efficiency of air separator 26 in separating the air from the liquid fuel.

As shown in FIG. 1, passage 24 communicates with the air separator 26 at a point adjacent the larger diameter thereof and in a manner so that the fuel enters the air separator in a direction substantially tangent to the conical surface thereof. Preferably, the passage 24 is also disposed at an acute angle relative to the axis of the air separator 26 so as to direct the incoming fuel into the air separator 26 in a direction away from the apex of the air separator to further improve the efficiency thereof by requiring the fuel to change its axial direction in passing through the air separator. Since the liquid fuel is heavier than the air, the air will be drawn toward the center of the whirling vortex and away from the discharge passage 28 adjacent the apex of the separator.

A hollow plug 67 closes the base of the air separator 26 and is provided with a radially directed passage 69 in which is loosely positioned a wiggle wire 70 having a slight clearance with passage 69 to facilitate the easy passage of air from the air separator 26 while impeding the flow of liquid fuel through the passage 69. Passage 69, in turn, communicates with a diagonal passage 71 in the housing 10 for delivering the removed air to the cavity in which charge pump 40 is positioned. The pressure in the charge pump cavity and in the housing 10 may be maintained at any suitable pressure, say, about 8 to 10 lbs. p.s.i., by a spring-biased dumping valve 72 (FIG. 2) as hereinafter more fully described and returns any excess fuel to the transfer pump inlet through passage 95. Since the output pressure of the transfer pump 18 is substantially greater than the housing pressure as controlled by valve 72, there is a continuous limited leakage of fuel through passage 69.

While the air separator 26 disposed upstream of the metering port 41 has been found to be quite effective in removing any air entrained with the incoming fuel, there is also provided, in accordance with this invention, a further means for eliminating any air which may find its way into annulus 51 of rotor 14, particularly after a period of idleness of the fuel pump.

Referring to FIGS. 1 and 2, there is provided at top dead center of bore 12 of housing 10, an axial recess or V-shaped groove 51a having a height of about 10 mils and a 60° included angle which extends axially from annulus 51 to the end of bore 12 of housing 10 to accommodate a small constant flow of metered fuel to the cavity containing the charge pump 40. Since the recess 51a is positioned at top dead center, the air in the annulus 51 will migrate to the vicinity of recess 51a to be discharged from the annulus 51 into the cavity in which the charge pump 40 is positioned.

As hereinbefore described, fuel is continuously discharged into the cavity of the charge pump 40 by passage 71 and groove 51a. Centrifugal force resulting from the rotation of the shaft 60 and governor 31 will tend to concentrate such air at the centers of rotation hereof. In addition to the continuous flow of fuel into the charge pump cavity, additional means are provided to promote the positive flow of fuel within the housing cavity to carry such trapped air out of the housing 10.

Referring specifically to FIG. 1, a passageway 81 in the shaft 60 communicates with the bore thereof and with a port 80 in a wall of the governor chamber 92 to provide for the positive flow of fuel therethrough. Fuel may also pass from the bore 82 past the rollers 43 of the charge pump and between the teeth 83 of step-up gears 84 and 85 which drive the governor 31 from the shaft 60. Fuel will flow radially inwardly or outwardly through passageway 81 dependent upon whether the pressure generated by the rotation of the governor weights is greater than the pressure imposed on the fuel within the passageway 81 due to the rotation of drive shaft 60. In any event, there is a continuous positive flow of fuel through the center of the shaft as a result of the pressure generated by the governor weights and by the continuous flow of fuel into the cavity of the charge pump 40 through passage 71 and V-shaped groove 51a.

The centrifugal weights also cause a continuous positive flow of the fuel through the annular clearance 94 surrounding the governor cage 86 and through a plurality of stationary radial passages 87 formed in the end wall of the governor chamber. The fuel then flows through a port 89 in the end of governor cage 86 from whence it flows through an aperture 88 in the thrust washer 90 and past spider 99 thereby to require circulation of fuel adjacent the metering valve shaft 34 to prevent an air pocket at the center of the thrust washer.

An annular clearance 91 communicates with the governor chamber 92 by a restricted annulus 93 which results from a difference in diameter of the passageway 93 and the shaft of valve 34 by a difference in diameter of the order of 2½–4 mils. From the annular passage 91 the housing fuel flows to a passage 96 (see FIG. 2) which communicates with the downstream side of the housing pressure relief valve 72.

A passage 98 between the end of the lowermost radial passage 87 on the end wall of the governor chamber (FIG. 1) delivers fuel to the bore of the dumping valve 72 (FIG. 2) to maintain housing pressure and returns excess fuel to the pump inlet 22 through passage 95. Since the housing pressure is about 8–10 lbs. above the pressure in the passage 96, it is apparent that there will be a continuous return of a small amount of fuel to the fuel reservoir. Since the restricted annulus is of such size that it readily passes air but offers resistance to the flow of liquid fuel, the restriction is one which favors the passage of air from the governor chamber and thus minimizes the amount of fuel returned to the fuel reservoir.

From the foregoing, it is readily apparent that this invention provides for the efficient purging of air from the fuel entering the pump and for the positive lubrication of the governor and the drive shaft coupling to the rotor.

As will be apparent to persons skilled in the art, various modifications and adaptations of the structure above described will become readily apparent without departure from the spirit and scope of the invention, the scope of which is defined in the appended claims.

I claim:

1. A fuel pump comprising a housing having an inlet passage and outlet passages, a central bore in said housing, a fuel distributing rotor positioned in said bore and having fuel inlet port means adapted to communicate with the inlet passage and having outlet port means adapted to communicate in sequence during the rotation of said rotor with the outlet passages of said housing to permit alternate admission and discharge of fuel from the interior of the rotor, said fuel pump having a low pressure transfer pump mounted on one end of the rotor, a charge pump mounted on the other end thereof, and a metering valve for controlling the output of the fuel pump, the improvement wherein conduit means are provided for delivering fuel from said transfer pump to said charge pump, and a vortex air separator is provided in said conduit means between said transfer pump and said charge pump, said air separator comprising a cone shaped recess and having an inlet port adjacent its larger diameter to receive fuel from said transfer pump, a fuel outlet port adjacent its apex for delivering purged fuel to the charge pump, and an air vent communicating with the central portion of the base of said recess.

2. A fuel pump as recited in claim 1 where the inlet passage to said air separator is disposed so as to deliver the fuel thereto in a direction substantially tangent with the conical surface thereof.

3. A fuel pump as recited in claim 1 wherein said inlet passage to the air separator delivers the fuel into said air separator at an acute angle with respect to the axis thereof and in a direction away from the apex thereof.

4. A fuel pump as recited in claim 2 wherein the end portion of said inlet passage is of reduced cross section to increase the velocity of fuel entering the air separator.

5. A fuel pump as recited in claim 1 wherein the fuel inlet port means of said fuel distributing rotor includes an annulus for receiving fuel from said metering valve and means are provided for continuously discharging a limited amount of metered fuel from said annulus.

6. A fuel pump as recited in claim 5 wherein said discharge means is positioned at top dead center with respect to the said central bore.

7. A fuel pump as recited in claim 6 wherein said discharge means comprises a generally axial groove formed in the surface of the central bore of said housing.

8. [A] *In a* fuel pump comprising a housing containing fuel under pressure and having an inlet passage and outlet passages, a central bore in said housing, a fuel distributing rotor positioned in said bore and having fuel inlet port means adapted to communicate with the inlet passage and having outlet port means adapted to communicate in sequence during the rotation of said rotor with the outlet passages of said housing to permit alternate admission and discharge of fuel from the interior of the rotor, a low pressure transfer pump mounted on one end of the rotor, a charge pump mounted on the other end thereof, a metering valve for controlling the outlet of the fuel pump [and a vortex air separator upstream of said metering valve and said charge pump], a shaft having a central cavity coupled to one end of said rotor to drive the same and a centrifugal governor *disposed in a governor chamber* for controlling said metering valve, the improvement wherein *means including* conduit means are provided for connecting said shaft cavity with the governor chamber *and* for the positive circulation of fuel through said shaft cavity, additional conduit means are provided for the positive circulation of fuel through the governor chamber, and discharge means communicating between said governor chamber and the exterior of the pump housing are provided to eliminate any air otherwise confined within the pump housing.

9. The fuel pump recited in claim 8 wherein said conduit means for circulating fuel through the pump governor chamber includes stationary radial grooves on an end wall of the governor chamber.

10. The pump as recited in claim 8 wherein said discharge means includes a restricted portion favoring the discharge of air over the discharge of liquid fuel.

11. The fuel pump as recited in claim 8 wherein the centrifugal governor serves to pump the fuel through the shaft cavity and the governor chamber.

*12. The fuel pump as described in claim 8 wherein said discharge means communicates with the governor chamber adjacent the center of rotation of said governor.*

References Cited

The following references, cited by the Examiner, are of record in the patented file of this patent or the original patent.

UNITED STATES PATENTS

| | | | |
|---|---|---|---|
| 2,641,238 | 6/1953 | Roosa | 103—2 |
| 3,098,604 | 7/1963 | Dubberley | 230—206 |

| | | | |
|---|---|---|---|
| 3,181,468 | 5/1965 | Roosa | 103—2 |
| 3,186,513 | 6/1965 | Dunn et al. | 103—111 |
| 3,215,079 | 11/1965 | Roosa | 103—2 |
| 3,257,957 | 9/1966 | Tracy | 103—111 |
| 3,273,513 | 9/1966 | Roper | 103—42 |

CORNELIUS J. HUSAR, Primary Examiner

U.S. Cl. X.R.

418—212